United States Patent
Halstead

(10) Patent No.: US 10,519,334 B2
(45) Date of Patent: Dec. 31, 2019

(54) POLYSACCHARIDE-BASED WATER-COMPATIBLE WOOD STAIN

(71) Applicant: Joshua Halstead, Parma, OH (US)

(72) Inventor: Joshua Halstead, Parma, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/722,715

(22) Filed: Oct. 2, 2017

(65) Prior Publication Data

US 2018/0094158 A1    Apr. 5, 2018

Related U.S. Application Data

(60) Provisional application No. 62/402,016, filed on Sep. 30, 2016.

(51) Int. Cl.

| | | |
|---|---|---|
| *C09D 15/00* | (2006.01) |
| *C09D 105/00* | (2006.01) |
| *C09D 175/04* | (2006.01) |
| *C08G 18/64* | (2006.01) |
| *C08G 18/73* | (2006.01) |
| *C08G 18/75* | (2006.01) |
| *C08G 18/76* | (2006.01) |
| *C08G 18/28* | (2006.01) |

(52) U.S. Cl.
CPC ............ *C09D 15/00* (2013.01); *C08G 18/283* (2013.01); *C08G 18/6484* (2013.01); *C08G 18/73* (2013.01); *C08G 18/755* (2013.01); *C08G 18/758* (2013.01); *C08G 18/7621* (2013.01); *C08G 18/7678* (2013.01); *C09D 105/00* (2013.01); *C09D 175/04* (2013.01)

(58) Field of Classification Search
CPC .... C09D 15/00; C09D 105/00; C09D 175/04; C08G 18/6484; C08G 18/73; C08G 18/755; C08G 18/758; C08G 18/7621; C08G 18/7678; C08G 18/283
See application file for complete search history.

(56) References Cited

U.S. PATENT DOCUMENTS

| | | | | |
|---|---|---|---|---|
| 4,590,265 A | * | 5/1986 | Bogan | C08B 3/22 106/31.69 |
| 4,656,202 A | * | 4/1987 | Nason | C09D 4/06 428/425.1 |
| 5,116,408 A | | 5/1992 | Crozer | |
| 6,524,653 B1 | * | 2/2003 | Jones | C08B 11/20 106/136.1 |
| 8,252,426 B2 | * | 8/2012 | Hayward | C08H 8/00 428/532 |
| 8,937,119 B2 | * | 1/2015 | Amiel | B01J 31/2213 524/48 |
| 9,080,030 B2 | * | 7/2015 | Amiel | C09D 5/027 |
| 9,683,124 B2 | * | 6/2017 | Schaller | C09D 101/26 |
| 2008/0275168 A1 | | 11/2008 | Schierlmann | |
| 2011/0036928 A1 | * | 2/2011 | Dredge | B62D 65/005 239/337 |

FOREIGN PATENT DOCUMENTS

| | | | | |
|---|---|---|---|---|
| CN | 101245219 A | * | 8/2008 | |
| EP | 2682408 | | 1/2014 | |
| WO | 2001035719 | | 5/2001 | |
| WO | 2007102877 | | 9/2007 | |
| WO | WO-2015044293 A1 | * | 4/2015 | ............ C08B 11/22 |

OTHER PUBLICATIONS

Lorama Polysaccharide Resin Technology LPRT, Lorama Group, www.altakem.com/wp-content/uploads/2019/04/PRESENTACION-LPR76-OCT.-2014.pdf (Oct.). (Year: 2014).*
PCT International Search Report, dated Jan. 19, 2018.
PCT Written Opinion of the International Searching Authority, dated Jan. 19, 2018.

* cited by examiner

*Primary Examiner* — Anthony J Green
(74) *Attorney, Agent, or Firm* — Morgan, Lewis & Bockius LLP

(57) ABSTRACT

Water-based stains comprise or consist essentially of a polysaccharide resin and a crosslinking agent such as an isocyanate. Upon evaporation of water, the polysaccharide undergoes crosslinking with the isocyanate component, developing water resistance so that it will not redissolve upon application of a water-based or oil-based clearcoat; as a result, lifting is minimized after a drying time of, e.g., two to six hours.

11 Claims, No Drawings

POLYSACCHARIDE-BASED WATER-COMPATIBLE WOOD STAIN

CROSS-REFERENCE TO RELATED APPLICATION

This application claims priority to and the benefit of, and incorporates herein by reference in its entirety, U.S. Provisional Patent Application No. 62/402,016, which was filed on Sep. 30, 2016.

TECHNICAL FIELD

The subject matter hereof relates to staining of wood products such as hardwood floors and furniture.

BACKGROUND

Wood floors are frequently employed in quality housing and offices. The bare wood may be stained to alter its color, enabling, for example, the use of durable, damage-resistant wood whose natural color would be unsuitable for its surroundings. Stains may be oil-based or water-based. The latter offer numerous advantages such as soap-and-water cleanup, non-flammability, low odor, and minimal environmental impact. Currently, however, water-based wood stains are used primarily for small jobs. They have not been widely adopted in the flooring and large furniture sectors because they tend to exhibit various problems such as lapping, lifting, difficulty in application, and/or inconsistent appearance.

Lapping is a visual defect that occurs when applying stain to a large surface in sections. It results in a darker color in the areas where one stained section overlaps another. Lapping often results from pigment particles interacting strongly with water-based polymers, which themselves interact strongly with the wood surface. Lifting is observed when a stain is either not completely dry, or is water/solvent-sensitive when a topcoat is applied thereover. This results in reduced clarity and loss of adhesion between the stain and the topcoat.

Application difficulty often arises when staining large areas by hand using rags, as is common practice. Existing water-based stains are often "sticky" and require substantial effort in initially applying the stain and wiping excess away. Following application, it is usually found that water-based stains lack the richness and warmth of oil/solvent based stains. This results in an inconsistent appearance that resembles plastic.

Accordingly, there is a need for stains that offer the advantages of a water-based product without the disadvantages noted above.

SUMMARY

In various embodiments, a water-based stain in accordance herewith comprises or consists essentially of a polysaccharide resin and an isocyanate. Upon evaporation of water, the polysaccharide undergoes crosslinking with the isocyanate component, developing water resistance so that it will not redissolve upon application of a water-based or oil-based clearcoat; as a result, lifting is minimized after a drying time of, e.g., two to six hours. The hydrophilicity of the polysaccharide component allows the composition to wet the polar cellulosic structure of wood and develop a consistent appearance. Because the polysaccharide is fully solubilized, the composition has low viscosity and is easily applied; this also provides advantageous lapping resistance because the composition can rewet and/or redissolve.

In one aspect, the invention pertains to a wood stain composition including an aqueous solution of a crosslinkable polysaccharide; a crosslinking agent crosslinkable with the polysaccharide upon drying of the aqueous solution; and a pigment dispersion. In one implementation, the crosslinking agent consists essentially of a monomeric aliphatic diisocyanate, a toluene diisocyanate, a hexamethylene diisocyanate, a naphthalene diisocyanate, a methylene bis-cyclohexylisocyanate, and/or an isophorone diisocyanate.

The composition may further include a thickener. The thickener may consist essentially of hydroxyethyl cellulose, hydrophobically-modified ethylene oxide-based urethanes, hydrophobically-modified alkali soluble emulsions, and/or other alkali-soluble associative thickeners. In some embodiments, the composition includes a defoamer. In addition, the composition may include an amine; the amine may consist essentially of dimethylethanolamine, monoethylethanolamine, trimethylethanolamine, morpholine, and/or ammonia. In various embodiments, the composition further includes a surfactant. The surfactant may be a nonionic surfactant. In one embodiment, the surfactant is an octylphenol ethoxylate surfactant. In some embodiments, the surfactant has a hydrophile-lipophile balance value between 5 and 15.

As used herein, the term "polysaccharide resin" means a film-forming polysaccharide polymer dissolved in a (typically aqueous) medium. The term "substantially" or "approximately" means±10% (e.g., by weight or by volume), and in some embodiments, ±5%. The term "consists essentially of" means excluding other materials that contribute to function or structure. For example, the optional pigment does not contributed to the performance of the coating and may be omitted; hence, it would not be excluded in a claim to a composition consisting essentially of other materials. Percentages refer to weight percentages unless otherwise indicated.

DETAILED DESCRIPTION

Polysaccharides are polymers of simple sugar building blocks, and may be crosslinked into hard, three-dimensional polymer networks. Compositions in accordance herewith include an aqueous solution of a crosslinkable polysaccharide and a crosslinking agent crosslinkable with the polysaccharide upon drying of the aqueous solution. These two components are generally packaged separately and combined just prior to application. The crosslinking agent may undergo an addition reaction with hydroxyl groups of the polysaccharide and may be, for example, an isocyanate (e.g., a monomeric aliphatic diisocyanate, a toluene diisocyanate, a hexamethylene diisocyanate, a naphthalene diisocyanate, a methylene bis-cyclohexylisocyanate, and/or an isophorone diisocyanate). Polymer network properties can be tailored by adjusting the concentration of the dissolved polysaccharide and the amount of crosslinking agent.

Suitable generic formulations are as follows:

| Component | Weight % |
| --- | --- |
| Amine | 0.1%-2% |
| Thickener | 0.1%-2% |
| Defoamer | 0.1%-1% |
| Octylphenol ethoxylate surfactant | 0.1%-5% |

-continued

| Component | Weight % |
| --- | --- |
| Pigment dispersion | 2%-15% |
| Polysaccharide solution | 5%-40% |
| Isocyanate | 3%-20% |

The thickener is used to adjust the viscosity of the composition to a desired value. Suitable thickeners include hydroxyethylcellulose, hydrophobically-modified ethylene oxide-based urethanes, hydrophobically-modified alkali soluble emulsions, and/or other alkali-soluble associative thickeners. The amine, in turn, is used to activate the thickener. Suitable amines include dimethylethanolamine, monoethylethanolamine, trimethylethanolamine, morpholine, and/or ammonia. The defoamer is employed break foam generated during formula processing and/or application of the stain onto wood; suitable defoamers include deaerators such as AIREX 900, available from TEGO. All three of these components are optional. The surfactant may have a hydrophile-lipophile balance (HLB) value between 5 and 15.

A suitable polysaccharide is the LPR76 product supplied by Lorama Group Inc., Ontario, Canada, and a suitable isocyanate is the Bayer DESMODUR H (HDI) product. No drying agent is needed. The system can be pigmented using any suitable pigment composition (most common water-based pigments dispersions can be employed) to the desired color space.

The polysaccharide component may be formed by mixing the water, amine, thickener, defoamer, polysaccharide and pigment dispersions in a vessel until homogeneous. Just prior to stain application the isocyanate component is added.

While the invention has been described in conjunction with the specific embodiments thereof, one of ordinary skill in the art will understand that any alternatives, modifications, and variations of the types of the ingredients and/or the amounts thereof contained in the single formula finish are possible and are they within the scope of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A wood stain composition comprising:
    an aqueous solution of a crosslinkable polysaccharide having a structure wherein at least one hydroxyl group is bonded to at least one carboxyl group of an alkyd;
    a crosslinking agent crosslinkable with the polysaccharide upon drying of the aqueous solution; and
    a pigment dispersion.
2. The composition of claim 1, wherein the crosslinking agent consists essentially of a monomeric aliphatic diisocyanate, a toluene diisocyanate, a hexamethylene diisocyanate, a naphthalene diisocyanate, a methylene bis-cyclohexylisocyanate, or an isophorone diisocyanate.
3. The composition of claim 1, further comprising a thickener.
4. The composition of claim 3, wherein the thickener consists essentially of hydroxyethylcellulose, hydrophobically-modified ethylene oxide-based urethanes, or hydrophobically-modified alkali soluble emulsions.
5. The composition of claim 1, further comprising a defoamer.
6. The composition of claim 1, further comprising an amine.
7. The composition of claim 6, wherein the amine consists essentially of dimethylethanolamine, monoethylethanolamine, trimethylethanolamine, morpholine, or ammonia.
8. The composition of claim 1, further comprising a surfactant.
9. The composition of claim 8, wherein the surfactant is a nonionic surfactant.
10. The composition of claim 9, wherein the surfactant is an octylphenol ethoxylate surfactant.
11. The composition of claim 8, wherein the surfactant has a hydrophile-lipophile balance value between 5 and 15.

* * * * *